Figures 1, 2, 3, 4, 5:
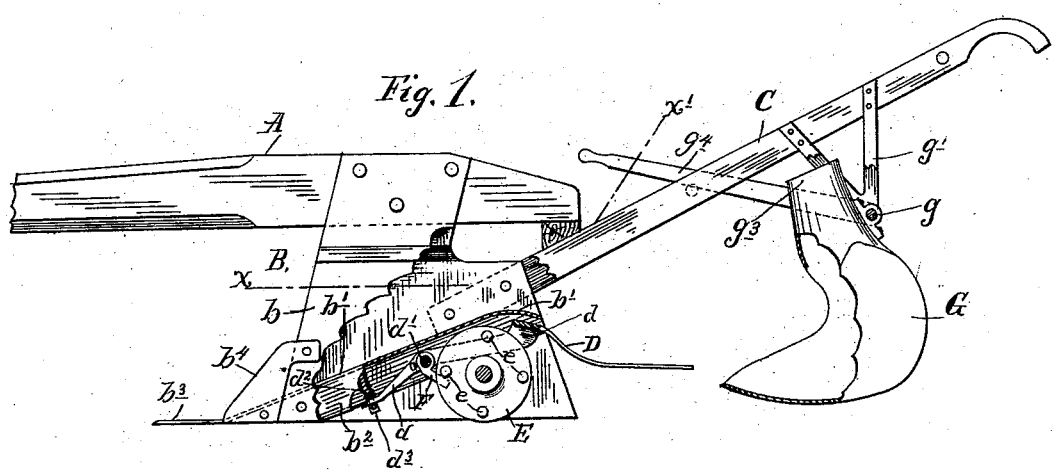

(No Model.)

G. D. N. EDIE.
POTATO DIGGER.

No. 513,769. Patented Jan. 30, 1894.

Witnesses.
E. F. Elmore
Frank D. Merchant

Inventor.
Gifford D. N. Edie
By his Attorney.
Jas. F. Williamson

THE NATIONAL LITHOGRAPHING COMPANY,
WASHINGTON, D. C.

UNITED STATES PATENT OFFICE.

GIFFORD D. N. EDIE, OF MINNEAPOLIS, MINNESOTA.

POTATO-DIGGER.

SPECIFICATION forming part of Letters Patent No. 513,769, dated January 30, 1894.

Application filed March 7, 1893. Serial No. 465,009. (No model.)

*To all whom it may concern:*

Be it known that I, GIFFORD D. N. EDIE, a subject of the Queen of Great Britain, residing at Minneapolis, in the county of Hennepin and State of Minnesota, have invented certain new and useful Improvements in Potato-Diggers; and I do hereby declare the following to be a full, clear, and exact description of the invention, such as will enable others skilled in the art to which it appertains to make and use the same.

My invention relates to potato-diggers; and has for its object to provide a device for the above purpose, which is cheap in construction, and simple and efficient in operation. I attain these objects in my present invention, the preferred form of which is illustrated in the accompanying drawings, wherein like letters refer to like parts throughout the several views.

Figure 1 is a left side elevation of the machine, some parts being broken away. Fig. 2 is a view of the machine, partly in plan and partly in horizontal section, taken on the line X X' of Fig. 1. Fig. 3 is a detail in vertical section, showing a portion of the machine, taken on the line Y Y' of Fig. 2. Fig. 4 is a view in cross section, illustrating the preferred form of the traction roller; and Fig. 5 is a detail, in rear elevation, of the screen.

It may be here stated that the frame-work of the machine, as herein illustrated, is after the general design of an ordinary two-horse plow.

A is the draw-beam, B the scoop-like shovel, and C the handles of the machine. The sides of the shovel B are, as shown, formed of a pair of sheet-metal plates $b$, arranged vertically and longitudinally of the machine, and are secured to and form mutual braces with the draw-beam A and the handle bars C, by means of nuts and bolts, or in any other suitable way. The bottom of the shovel is formed by an inclined sheet-like portion or mold-board $b'$ rising toward the rear of the machine and having down-turned side flanges $b^2$ at its sides rigidly secured by means of rivets, or otherwise, to the side plates $b$. The mold-board $b'$ and the side plates $b$ of the shovel are provided, respectively, with a forwardly projecting triangular share $b^3$ and side cutters $b^4$, secured to their respective parts, by means of rivets or nutted-bolts as may be desired. The share and cutters may be of hardened steel, while the side and mold board portions $b$ and $b'$ may be of ordinary sheet-iron.

D is a sieve or screen which is preferably of a comb-like form, the teeth of which project rearward with a slight downward pitch, from beneath the rear edge of the mold-board $b'$, in position to receive the potatoes and dirt, as raised and delivered thereto by the shovel. The teeth of this comb-like screen D are spaced apart from each other sufficiently to pass the loose dirt, while preventing the potatoes from passing therethrough with the dirt.

The comb-like screen D is carried and supported by a pair of levers $d$ of the first class, fixed to a cross shaft $d'$, having bearings in the side plates $b$. The forward ends of these levers $d$ are held downward, to their limit, by spring $d^2$ on pivoted bolts $d^3$ depending from the bottom of the bottom-plate $b'$ of the shovel B. These bolts $d^3$ work, with their free ends through perforations in the said forward ends of the levers $d$ and have stop-pins $d^4$ beneath the said levers which serve to limit the downward movement of the same. The upper portions of the bolts $d^3$ are screw-threaded and are provided with nuts $d^5$, by means of which the springs $d^2$ are compressed upon the levers $d$, by an adjustable tension.

E is a loosely mounted laterally disposed traction roller, mounted in the side plates of the shovel B beneath the rear end of the mold board $b'$. The roller E is reduced at its ends to terminate the body portion short of the blades $b$ and is provided at its opposite ends with pins or drive lugs $e$.

F are cam-blocks or arms secured to the cross shaft $d'$, near the opposite ends of the same, in position to be engaged by the drive-lugs $e$ on the roller E. These cam-blocks F are pivotally and adjustably secured on the shaft $d'$ by means of set-screws $f$.

G is a pivoted scoop or catch-box rigid on a cross-shaft $g$ journaled in hanger-brackets $g'$ depending from the handle-bars C. This scoop is thus hung in a position immediately to the rear of, and in line with the comb-screen D, and is provided with a screen-like, or slotted bottom $g^2$, the slots of which are of such a size as to hold the potatoes and to pass loose dirt. The top of this scoop G is preferably constructed in the shape of a funnel, as shown at $g^3$, adapted when the scoop is inverted, or turned bottom side up, to empty out the potatoes through a delivery throat of suitable size adapted to deliver the same into bags. The scoop is inserted by means of a hand-lever $g^4$ rigid on one end of the shaft $g$.

$g^5$ is a stop-pin projecting laterally from one of the handle bars, in position to stop the downward movement of the lever $g^4$ and to thus limit the downward movement of the scoop G.

As preferably constructed, the traction roller E is provided on its periphery with longitudinal grooves or traction cleats, as shown at $e'$ in Fig. 4.

The operation of the device in harvesting potatoes is as follows:—The shovel being drawn forward in the act of digging, the share $b^3$ and cutters $b^4$ will, as is obvious, pass beneath the ground and unearth the potatoes, which together with the dirt will be passed over the mold-board, and fall upon the comb-like screen D. By the forward movement of the machine, the traction roller E will be revolved, bringing its drive-pins $e$ successively into engagement with the cam-arms F. This action will force the forward ends of the levers $d$ upward against their springs $d^2$, carrying the screen D downward a short distance, and then suddenly releasing the same, allowing the spring to become active to throw the screens upward. Thus a succession of vibrations will be given to the screen, which will violently agitate the potatoes and the soil, under which action, the dirt or soil will be separated from the potatoes and dropped through the screen, while the potatoes will be thrown off at the rear end of the screen and be caught in the scoop C. Any fine dirt which may have been thrown into the scoop will drop through the bottom of the same. As is obvious, the vibratory stroke of the screen may be varied by radially adjusting the cam-arms F on the shaft $d'$, to give a greater or less time of contact between the said cam-arms and the driving pins $e$ on the roller E. Again by the adjustment of the nuts $d^5$ on the bolts $d^3$, the tension of the springs $d^2$ may be varied to adapt the same to various weights and condition of soil.

It will be understood of course, that various changes in the detail construction of the device, may be made without departing from the spirit of my invention. For instance, the engagement of the driving pins or lugs $e$, on the traction roller E, with the cam-levers F, might be so arranged as to raise the sieve; in which case, the springs $d^2$ might be dispensed with, as the screen would then, by its own weight, drop under the action of gravity. I prefer to use the construction shown in the drawings, however, as in this arrangement, the springs $d^2$, act to throw the screen upward with a sudden impulse, which serves to throw or toss the potatoes into the catch scoop G.

In practice, the teeth of the comb-like screen D, would usually be in the form of a series of rods secured to a common bar or back, instead of being stamped from a common plate as shown in the drawings.

By reference to Fig. 5, it will be seen that the side teeth of the comb-like screen D are set at a higher level than the intermediate teeth so as to prevent the potatoes from running off at the sides of the screen.

What I claim, and desire to secure by Letters Patent of the United States, is as follows:

1. In a potato-digger, the combination with the shovel and mold-board, of the pivoted levers carrying a screen receiving from said mold board, one or more cam-lugs or arms rigidly and adjustably secured with said levers, the traction-roller journaled below the mold-board and provided with driving projections engaging with said cam-lugs to impart a vibrating motion to said screen, substantially as described.

2. In a potato-digger, the combination with the shovel and the vibrating screen receiving from said shovel and means for vibrating the screen, comprising the pivoted levers $d$ carrying said screen at their rear ends and subject to the action of the springs $d^2$ at their forward ends, the cam-lugs F rigidly secured with the said levers $d$, and the traction roller E journaled in the side plates of the shovel and provided with the driving lugs or projections $e$ engageable with the cam-lugs or arms F, the said parts being arranged to operate, substantially as described.

3. In a potato-digger, the combination with the shovel of the vibrating screen D, the pivoted levers $d$ carrying said screen on their rear ends, and subject to the action of the springs $d^2$ at their forward ends, means for adjusting the tension of said springs, the cam-lugs or arms F rigidly secured with the said levers $d$, and the traction roller E journaled in the sides of the shovel and provided with the driving lugs or projections $e$, engageable with the cam-arm or lugs F, the said parts operating, substantially as described.

In testimony whereof I affix my signature in presence of two witnesses.

GIFFORD D. N. EDIE.

Witnesses:
JAS. F. WILLIAMSON,
FRANK D. MERCHANT.